US012362465B2

(12) United States Patent
McCoy

(10) Patent No.: US 12,362,465 B2
(45) Date of Patent: Jul. 15, 2025

(54) FOLDING AND LOCKING MOBILE CELLULAR ANTENNA MOUNT

(71) Applicant: Sun West Engineering, Inc., Phoenix, AZ (US)

(72) Inventor: Phillip McCoy, Peoria, AZ (US)

(73) Assignee: Sun West Engineering, Inc., Phoenix, AZ (US)

( * ) Notice: Subject to any disclaimer, the term of this patent is extended or adjusted under 35 U.S.C. 154(b) by 267 days.

(21) Appl. No.: 18/178,836

(22) Filed: Mar. 6, 2023

(65) Prior Publication Data

US 2024/0304979 A1 Sep. 12, 2024

(51) Int. Cl.

*H01Q 1/32* (2006.01)
*H01Q 1/08* (2006.01)
*H01Q 1/12* (2006.01)
*H01Q 1/24* (2006.01)

(52) U.S. Cl.

CPC ........... *H01Q 1/3216* (2013.01); *H01Q 1/084* (2013.01); *H01Q 1/1235* (2013.01); *H01Q 1/246* (2013.01)

(58) Field of Classification Search

CPC .... H01Q 1/084; H01Q 1/1235; H01Q 1/1242; H01Q 1/246; H01Q 1/32; H01Q 1/3216; H01Q 1/3275; H01Q 3/04

See application file for complete search history.

(56) References Cited

U.S. PATENT DOCUMENTS 7,000,357 B1 * 2/2006 Stearns ................ H01Q 1/3216 52/118
2020/0299988 A1 * 9/2020 Newman ............... E04H 12/182

* cited by examiner

*Primary Examiner* — Daniel Munoz
(74) *Attorney, Agent, or Firm* — Newman Jones, PLLC

(57) ABSTRACT

A mobile cellular tower system includes an upwardly extendable mast mounted on a vehicle, a support platform connected to a top portion of the mast, a first pivot module connected to the support platform, and a first antenna mount connected to the first pivot module. The first pivot module is configured to pivot the first antenna mount between a stowed position and a deployed position.

19 Claims, 10 Drawing Sheets

FOLDING AND LOCKING MOBILE CELLULAR ANTENNA MOUNT

TECHNICAL FIELD

The present invention relates, generally, to vehicle-mounted cellular antenna systems and, more particularly, to a hinged antenna mount which facilitates transporting antennae pre-assembled and attached to an extendable mast.

BACKGROUND

Temporary cellular towers are often used during disaster recovery, sporting events, concerts, conventions, and other event driven spikes in mobile telephone usage which could otherwise overwhelm existing telecommunications infrastructure (typically linked cell towers communicating with a central switch). Ground based cell towers typically include an antenna for transmitting and receiving signals from handheld devices, a microwave panel for communicating bundled data to and from the switch, radio equipment and associated electronics, an AC/DC rectifier for supplying DC power to the various components, and a fixed mast for suspending the antenna and microwave panel above ground. Temporary, vehicle mounted cell phone towers thus require some version of these same components in order to seamlessly integrate into existing network infrastructure.

Temporary cell towers are typically trailer or truck mounted, and include the same (or similar) hardware and functionality as a permanent cell tower, for example, one or more antennae, an extendable/retractable mast for supporting the antennae at a desired elevation, radios, an optional microwave panel, equipment cabinets mounted on the truck bed or trailer, and a power generator and/or rectifier.

Presently known techniques for installing temporary cellular towers typically require one truck for the operational mobile station, another truck to haul the antennae, a third truck to carry the crane used to hoist the antennae onto the mast, and perhaps a fourth truck to transport a man-bucket used by personnel to attach the antennae to the mast and assemble the associated cabling. This is a cumbersome, time consuming, and costly procedure. Presently known masting techniques employ 400 to 800-pound capacity hydraulic or pneumatic masts which, in their retracted position, remain within the 162 inch (13' 6") practical height limit during transport. The masts, which typically comprise nested (telescoped) tubes, are then extended up to the 40 or 60 feet height required at the site.

Systems and methods are thus needed which overcome the limitations of the prior art.

Various features and characteristics will also become apparent from the subsequent detailed description and the appended claims, taken in conjunction with the accompanying drawings and this background section.

BRIEF SUMMARY

The present invention provides a platform affixed to the top of an extendable mast, with one or more antenna mounts hingedly or foldably secured to the platform. This arrangement permits each antenna to be partially or completely pre-assembled to its mount (mechanically and electrically), and thus connected to the mast. Each mount may then be retracted (e.g., folded) into a substantially horizontal position, which allows the assembly to be transported while remaining within recommended height restrictions. Once the vehicle arrives at the deployment site, each antenna mount (with the antenna connected thereto) can be manually lifted into the upright position and the mast hoisted in situ. By pre-assembling (mechanically and/or electrically) the antennae and disposing them in a retracted position during transportation, the time and labor required for on-site deployment may be significantly reduced.

It should be noted that the various inventions described herein, while illustrated in the context of a three antennae assembly, are not so limited. Those skilled in the art will appreciate that the inventions described herein may contemplate antennae of any number, size and capacity.

Various other embodiments, aspects, and features are described in greater detail below.

BRIEF DESCRIPTION OF THE DRAWING FIGURES

Exemplary embodiments will hereinafter be described in conjunction with the appended drawing figures, wherein like numerals denote like elements, and:

Figure 6:
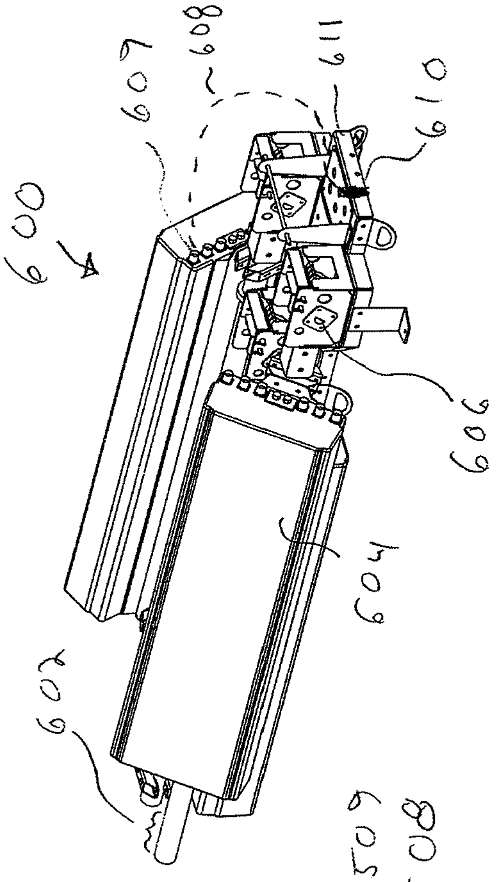
FIG. 6 is a schematic perspective view of the assembly of FIG. 5 showing the antennae retracted in the stowed position in accordance with various embodiments.
Figure 9:
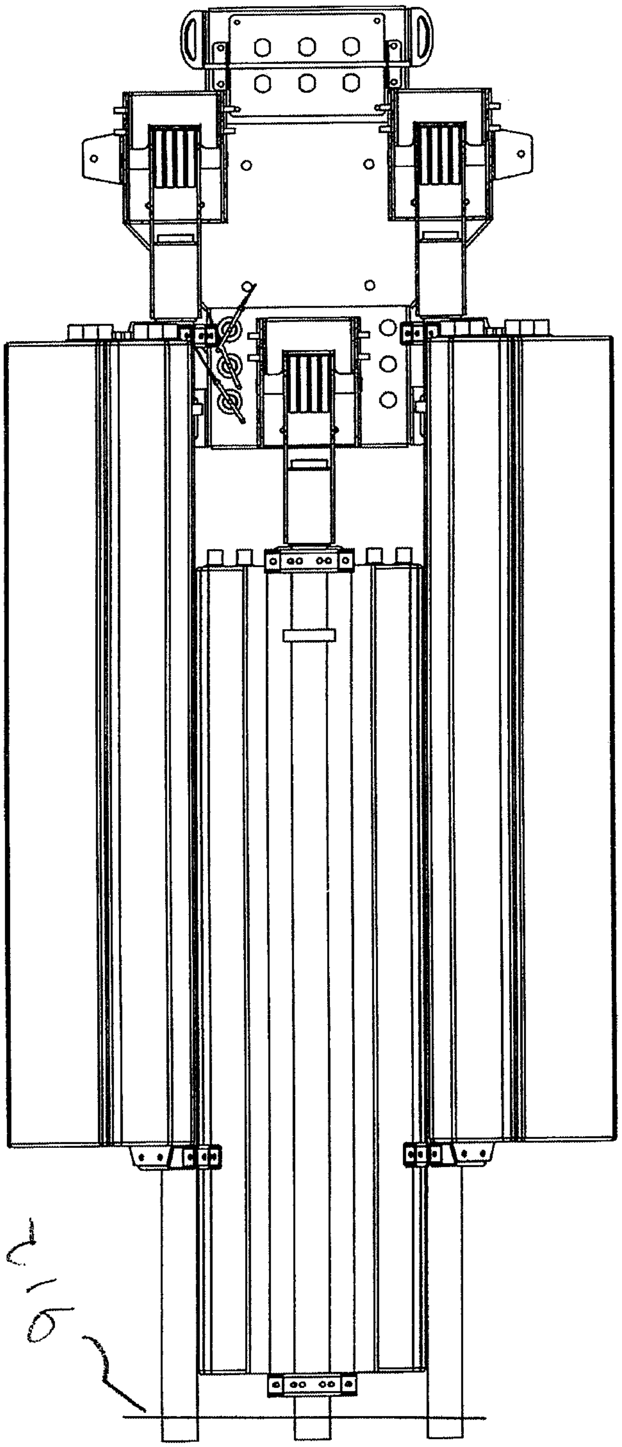
FIG. 9 is a top view of the assembly of FIG. 6 illustrating the distal ends of the antenna mounts lying along a straight line in the stowed position in accordance with various embodiments.
Figure 10:
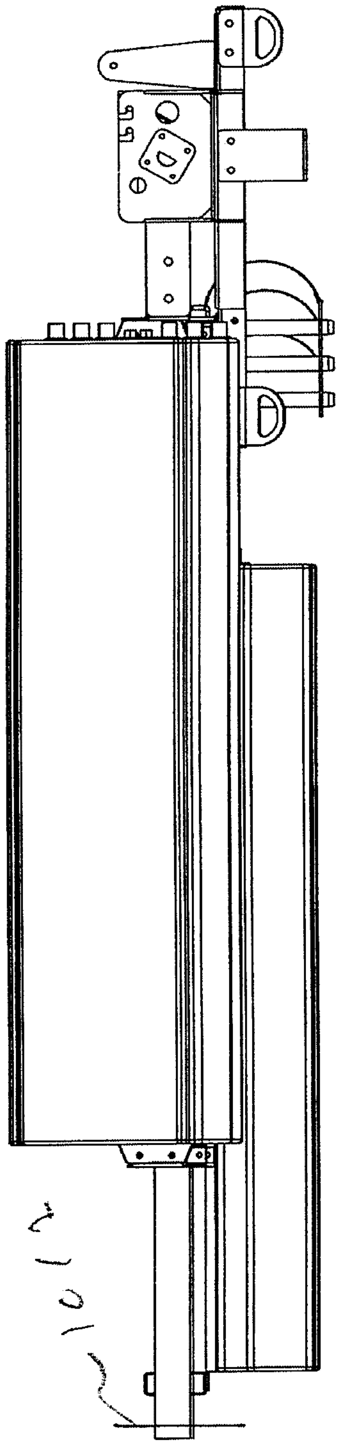
FIG. 10 is a schematic end elevation view (in a plane perpendicular to the direction of forward vehicle travel) of the assembly shown in FIG. 9 in accordance with various embodiments.
Figure 12:
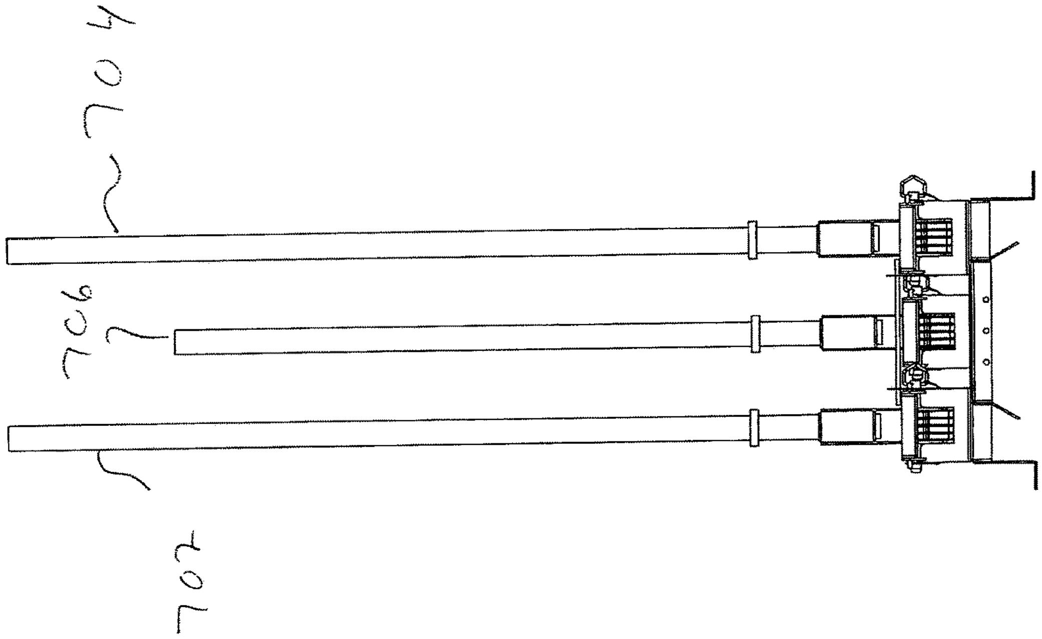
FIG. 12 is a schematic side elevation view of the assembly of FIG. 11, showing antenna mounts of different lengths in accordance with various embodiments.
Figure 14:
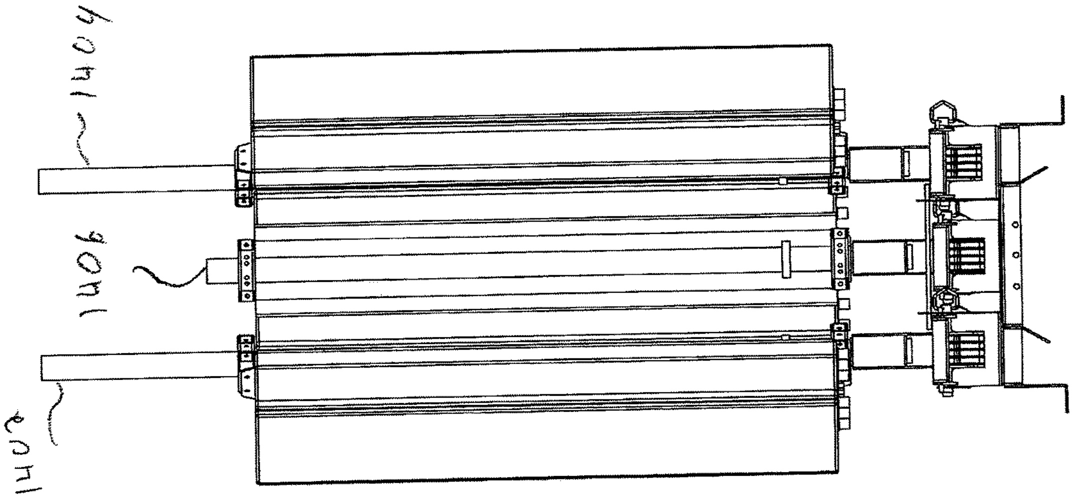
Figure 15:
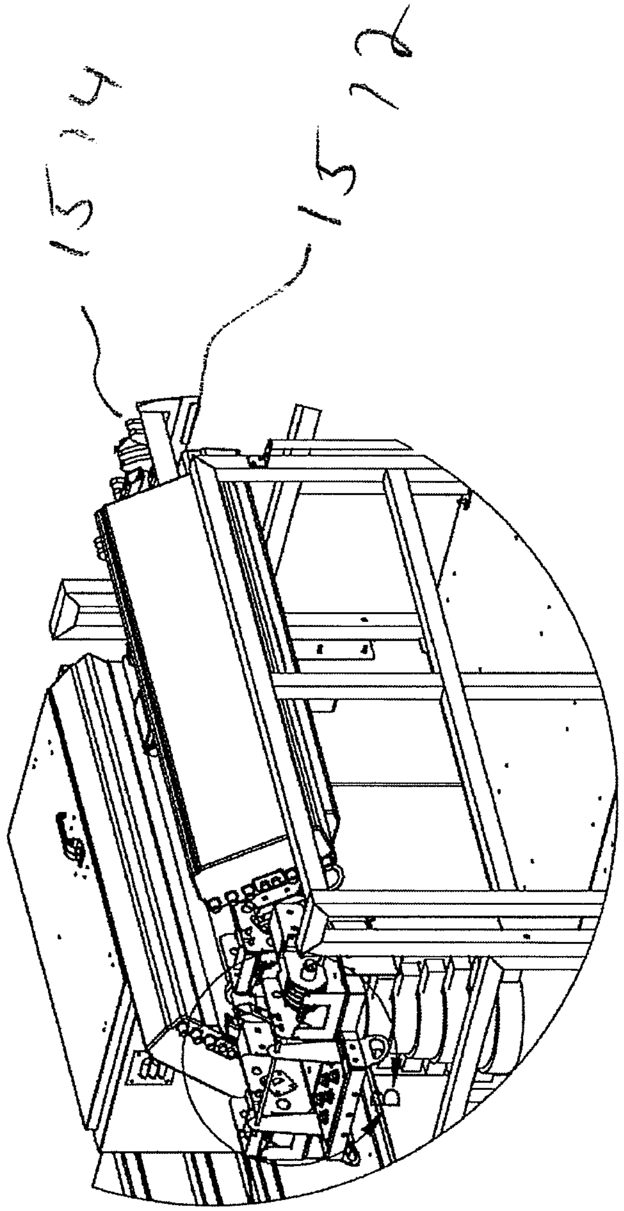

FIG. 14 is a schematic side elevation view (in a plane parallel to the direction of forward vehicle travel) of the antenna mounts of FIG. 12 shown with the antennae attached in accordance with various embodiments; and FIG. 15 is a schematic perspective view of the antenna assemblies of FIGS. 6, 9, and 10 in the stowed position, showing the distal ends of the antenna mounts secured to a locking assembly connected to the vehicle chassis in accordance with various embodiments.

DETAILED DESCRIPTION OF PREFERRED EXEMPLARY EMBODIMENTS

The following detailed description of the invention is merely exemplary in nature and is not intended to limit the invention or the application and uses of the invention. Furthermore, there is no intention to be bound by any theory presented in the preceding background or the following detailed description.

The present disclosure involves systems and methods for preassembling, stowing, transporting, and subsequently deploying vehicular mounted mobile cell tower systems. Various embodiments include: i) a platform attached atop an extendable mast, including one or more pivotable antenna mounts secured to the platform; ii) a plurality of antenna mounts of different lengths attached to an extendable mast; iii) one or more antennae configured to be placed in a stowed position during transportation and lifted into a deployed position in situ; iv) a locking assembly for locking one or more antenna mounts in a stowed position; v) a coil spring mechanism for assisting an operator in transitioning an antenna between a stowed and a deployed position; vi) a cable bulkhead configured to facilitate pivoting an antenna mount while maintaining electrical connection to radio equipment associated with the transport vehicle; and vii) one or more antennae pre-assembled to an extendable mast mounted on a vehicle.

In accordance with one aspect of the invention, a vehicle (e.g., truck, trailer, boat, rail car) includes an extendable mast assembly configured to support an antenna platform during travel to the installation site such that, in the retracted position, the total height of the mast and stowed antennas is less than a typical bridge height limit (e.g., 13 feet or, alternatively, 13 feet, 6 inches). The antennae are pre-attached to their respective antenna mounts and electrically connected to radio equipment located within the vehicle. The stowed antenna mounts are further configured to be manually (or automatically) extended (e.g., lifted, rotated, pivoted, unfolded) into a deployed position without the need to extensive assembly at the deployment site, resulting in substantial reduction in deployment time, cost, and labor.

In this way, the mast, antennae, pivoting antenna mounts, and ancillary equipment (refrigerated radio cabinets, generator, AC/DC converter, and associated electronics) may be contained on a single vehicle within a volume of space suitable for travel on public roads, without the need for additional vehicles to transport a crane, man buckets, and the like as previously required in prior art systems. By arranging the antennae and extendable mast assembly on a single, self-contained truck bed, the cost to and time needed to deploy a temporary cell tower in the field is greatly reduced.

According to a further aspect of the present invention, an extendable antenna mast assembly supports stowed antennae atop the mast while transporting the antenna to the installation site, while maintaining a combined stacked height less than the maximum recommended bridge/overpass clearance height, for example either 13 feet or 13 feet 6 inches from the ground. For a truck bed having a top surface located 36 inches above the ground, the combined height of the extendable mast, antenna platform, pivoting antenna supports, and the stowed antennae must fit within an approximately 120 inch height profile to stay within a 156 inch total height limit; alternatively, the mast assembly and antenna must fit within a 126 inch height profile to stay within a 162 inch height limit.

Figure 1:
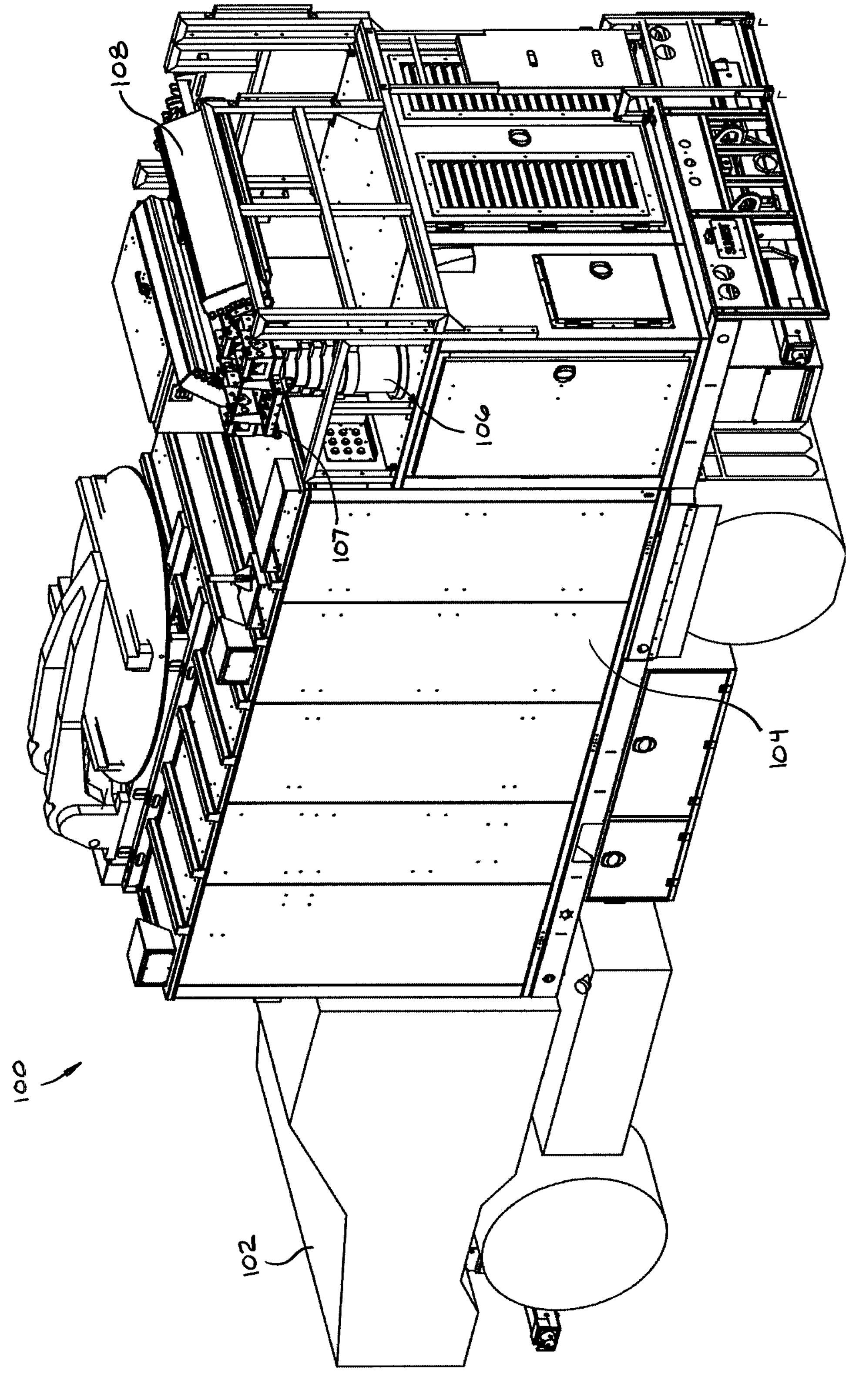
FIG. 1 is a schematic perspective view of an exemplary vehicle mounted cell tower system including a retracted mast supporting a plurality of antennae connected to their respective antennae mounts, shown in the stowed (e.g., substantially horizontal) position in accordance with various embodiments.

Referring now to FIG. 1, a vehicle mounted cellular tower system 100 is shown with the mast retracted and the antenna mounts (with antennae attached) in the stowed position. The system 100 includes a vehicle 102, an enclosure 104 housing radios and other electronics, an extendable and retractable mast 106 (e.g., telescopic, scissors), a platform 107 mounted to the top of the mast, and a plurality of antenna assemblies 108 pivotably mounted to the platform.

Figure 2:
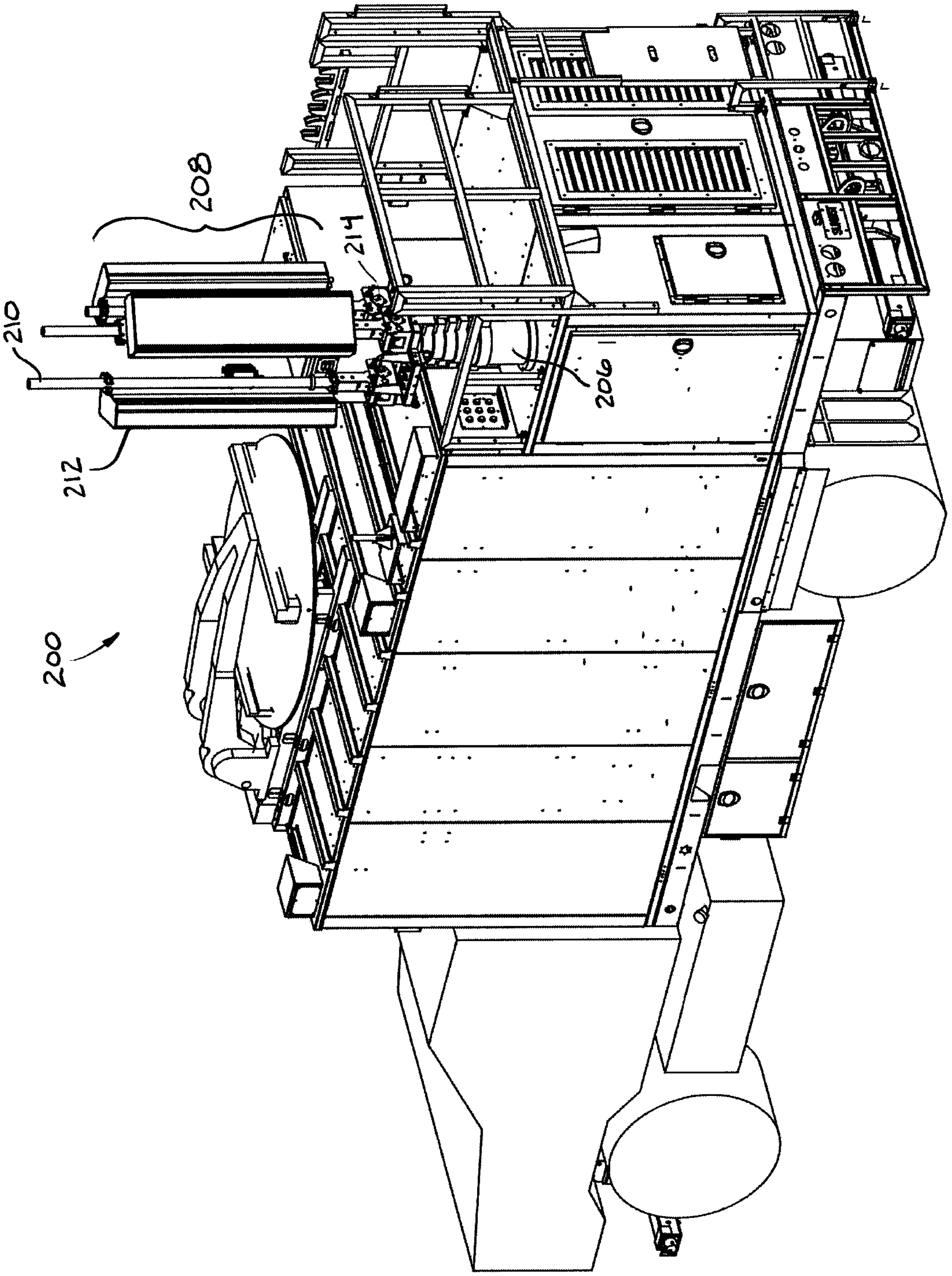
FIG. 2 is a schematic perspective view of the cell tower system of FIG. 1 with the antennae shown in their deployed (e.g., substantially vertical) position in accordance with various embodiments.

FIG. 2 illustrates a cell tower system 200 including a mast 206 in the retracted position and an antenna assembly 208 shown in the deployed position. The antenna assembly 208 includes respective antenna mounts 210 each having an antenna 212 attached thereto and configured to pivot (via a pivot module 214) between the stowed (e.g., substantially horizontal) position shown in FIG. 1 and the deployed (substantially vertical) position shown in FIG. 2.

Figure 3:
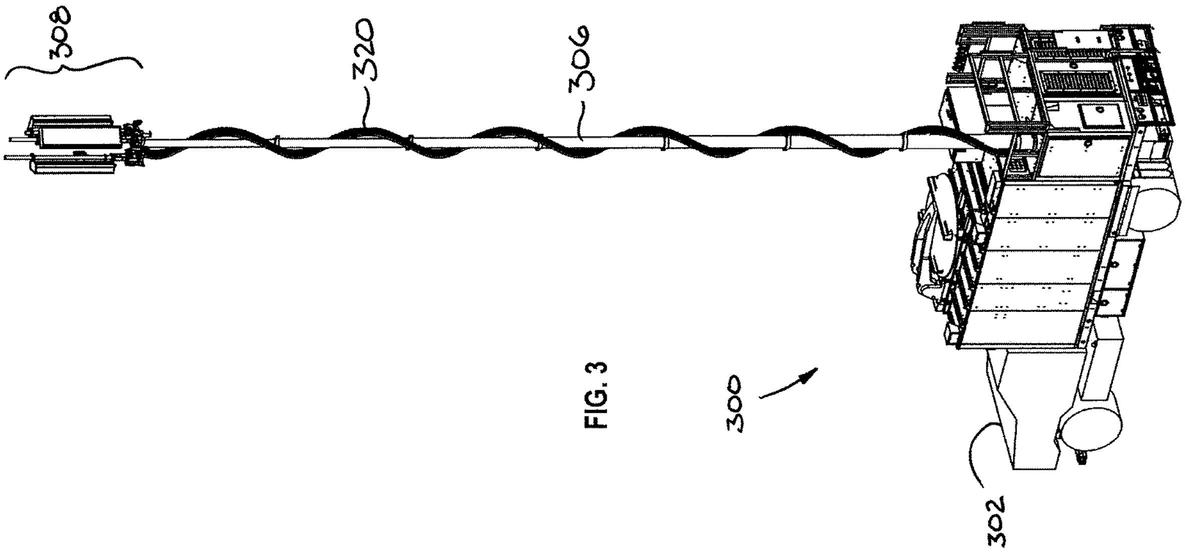
FIG. 3 is a schematic perspective view of the cell tower system of FIG. 2, showing the antennae in their deployed position atop a mast in an extended position in accordance with various embodiments.

FIG. 3 illustrates a cell tower system 300 showing an extended mast 306 and a deployed antenna system 308. A cabling assembly 320 is configured to supply power and maintain data communication between the antenna assembly 308 and various electronics (e.g., radios) housed within or otherwise associated with the vehicle 302.

Figure 4:
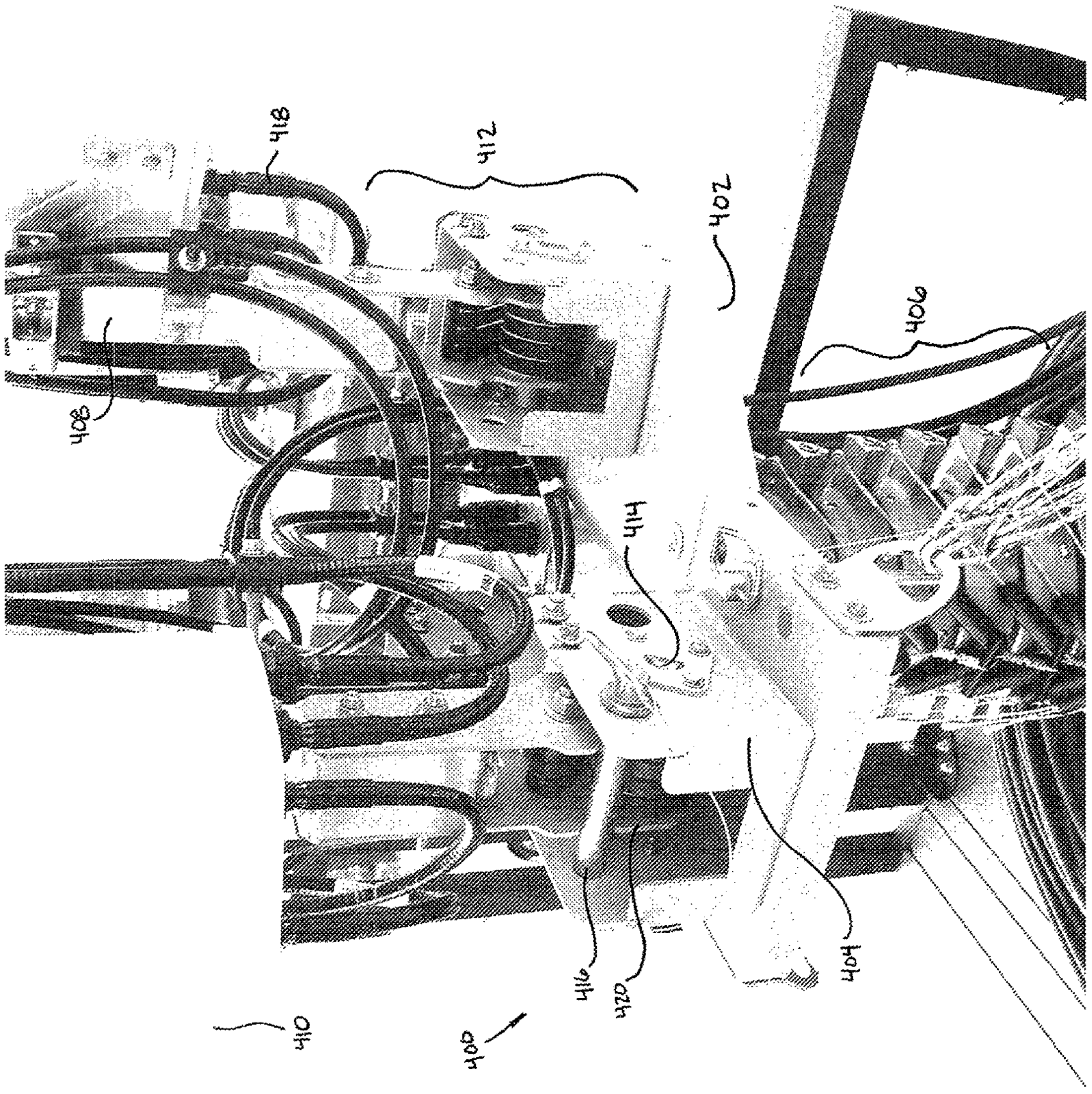
FIG. 4 is a detail view of a platform connected to the top of the mast, the platform supporting a plurality of antenna mount assemblies each configured to selectively pivot an antenna between a stowed position and a deployed position in accordance with various embodiments.

FIG. 4 is a detail view of an interface system 400 for mechanically and electrically connecting a foldable (or pivotable) antenna assembly to an extendable mast atop a vehicle. In the illustrated embodiment, the interface assembly 400 includes a substantially horizontal support platform 402 connected to the top of an extendable mast assembly 406. The platform 402 may support any desired number of antenna assemblies. Each antenna assembly suitably includes a pivot module 412, an antenna mount 408 pivotably connected to the pivot module, an antenna 410 removably affixed to the antenna mount, and communications cabling 418.

With continued reference to FIG. 4, each folding actuator 412 includes a bracket 404 mounted to the platform 402 and a hinge 414 about which the antenna mount 408 is configured to pivot. A removable lock (e.g., a bolt secured with a cotter pin) 416 secures the antenna in either the stowed position shown in FIG. 1 or the deployed position shown in FIG. 4. One or more springs 420, such as coil springs, may be used to assist the operator in raising and lowering the antennae.

Figure 5:
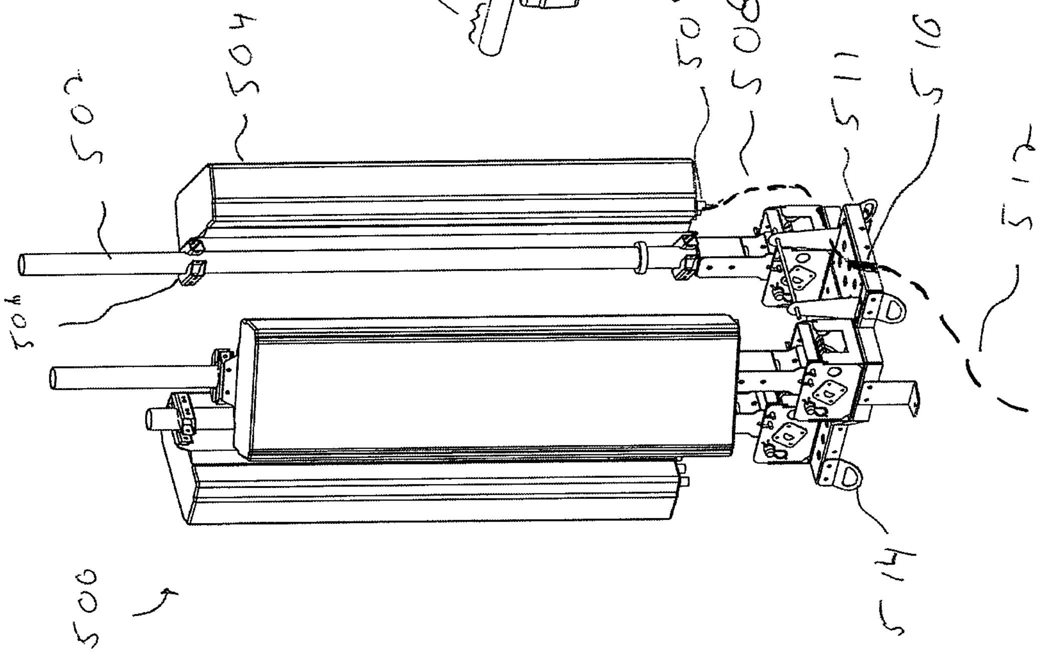
FIG. 5 is a schematic perspective view of an exemplary platform having three antenna mounts with their antennae extended in the deployed position, showing guy wire supports and an exemplary path for connecting electrical cabling to the antennae in accordance with various embodiments.

FIG. 5 illustrates an exemplary multi-antenna assembly 500 including three antennae mounted to a support platform 500. In the illustrated embodiment, each antenna is characterized by a substantially planar front surface, and the antennae are oriented approximately 120 degrees from each adjacent antenna. Each individual antenna assembly includes an antenna mount 502 pivotably secured to the platform. An antenna 504 is removably attached to each antenna mount using any suitable locking device 506. A plurality of guy wire supports 514 provide protection against wind during deployment With continued reference to FIG. 5, each antenna includes one or more cable ports 509 configured for connection to communication cables (e.g., MIL-SPEC coax cables). To facilitate pre-assembling the antennae prior to dispatching the vehicle to the deployment site, as well as rapid deployment of the electronics at the deployment site, a two-stage connection protocol is employed to connect the electronics housed within the vehicle (typically one or more radios) to each antenna. In particular, a first cable segment 508 (shown in phantom) connects the port 509 to a jumper 510 which may be integrated into or otherwise secured to the platform. In one embodiment, the jumper 510 comprises a male-to-male coaxial cable connector. A second segment 512 connects the jumper 510 to the radio and/or other electronics (e.g., power) housed within the vehicle. These connection components are configured to accommodate the antennae in both the stowed and deployed positions. In this way, the communication cables may be connected and the antennae placed in the stowed position during transportation to the deployment site, which allows the antennae to be deployed without having to connect communication cables in situ, thereby reducing deployment time, cost, equipment and labor.

FIG. 6 illustrates the antennae in the stowed position. In particular, each antenna mount (and associated antenna 604) is folded downwardly into a substantially horizontal orientation by pivoting or swinging the antenna and antenna mount about a hinge 606. In this position, a distal end 602 of each antenna mount is disposed proximate a stowage locking mechanism (shown and described in more detail below in connection with FIGS. 10 and 13-15).

With continued reference to FIG. 6, a first cable connection segment 608 (shown in phantom) extends between an antenna connection port 609 and a jumper 610 secured to a support platform 611. Viewed together, FIGS. 5 and 6 illustrate how the two stage cable connection allows the cables to be pre-assembled in a manner which permits the antennae to pivot between stowed and deployed positions without having to reconfigure the cabling.

The manner in which antenna mounts having different lengths (heights) may be locked in the stowed position using locks disposed along a straight line parallel to the direction of vehicle travel will now be described in conjunction with FIGS. 7-14.

Figure 7:
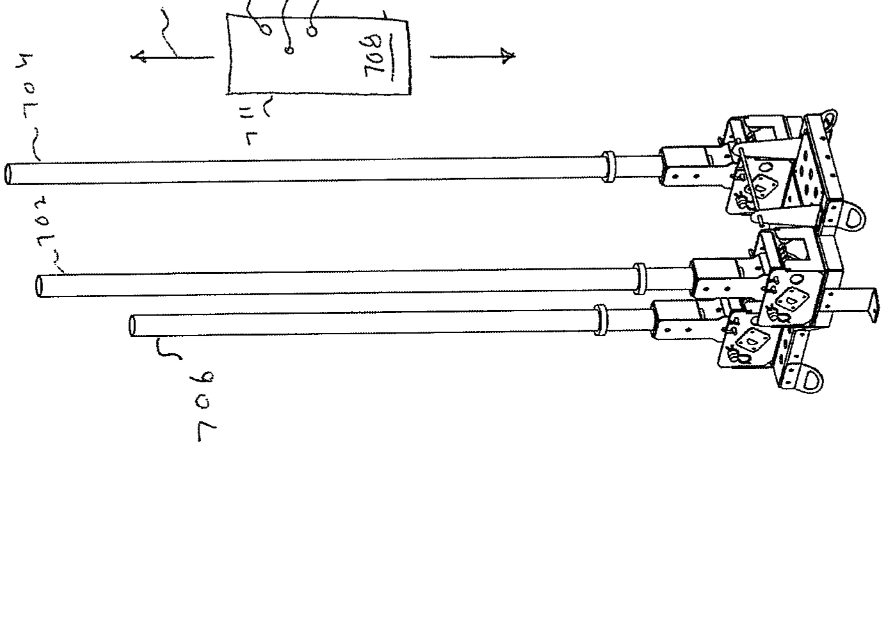
FIG. 7 is a schematic perspective view of the assembly of FIG. 5 with the antennae removed to show antenna mounts having different heights in accordance with various embodiments.

FIG. 7 illustrates the locations of antenna mounts 702, 704, and 706 relative to a direction 710 of forward or reverse travel of a vehicle 708. It can be seen that mounts 702 and 704 are longer (taller) than mount 706. It can also be seen that mounts 702 and 704 are disposed further away from the opposing side 711 of the vehicle than mount 706. By using mounts of greater length for those mounts positioned further away from the opposing side of the vehicle, and using mounts of lesser length for those mounts positioned closer to the opposing side of the vehicle, all mounts may be configured to terminate along a common lock line when transitioned from the deployed to the stowed position, as explained in greater detail below in conjunction with FIG. 8.

Figure 8:
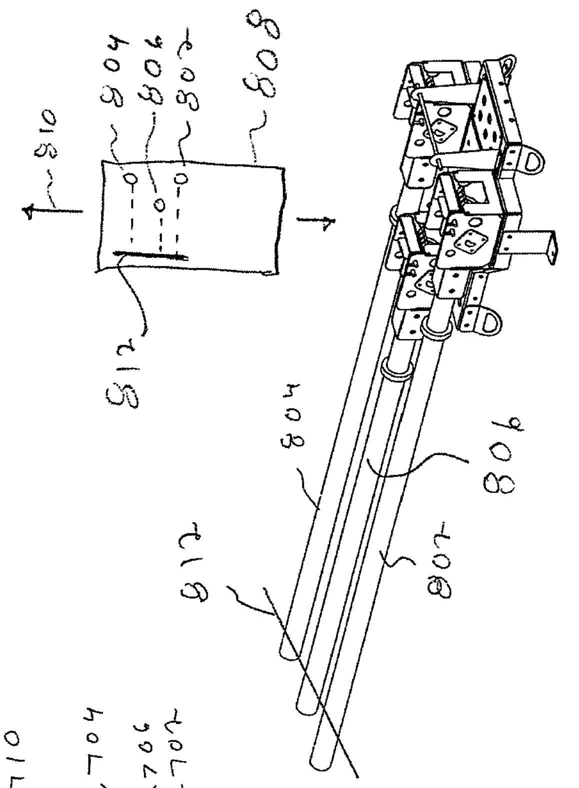
FIG. 8 is a schematic perspective view of the assembly of FIG. 6 with the antennae removed to show the distal (top) ends of the mounts terminating along a common straight line notwithstanding their different heights in accordance with various embodiments.

FIG. 8 illustrates the antenna mounts of FIG. 7 after they have been pivoted into the stowed position. In particular, antenna mounts 802 and 804 are longer (taller) than antenna mount 806. Antenna mounts 802 and 804 are also disposed further from the opposite side of the vehicle than antenna mount 8o6. As a result, when placed in the stowed position, the distal ends of all three mounts lie along a common line 812 parallel to the direction 810 of forward and reverse travel of the vehicle 808. This allows antenna mounts of maximum height to fit within the available side dimension of a typical over-the-road vehicle. In an alternate embodiment, the antenna mounts may be configured to lie along lines which are not orthogonal to the direction of vehicle travel, for example, they may be configured to lie along lines which are either parallel to the direction of travel or which at least have a vector component lying along the direction of vehicle travel.

FIG. 9 is a top view of a plurality (three illustrated) of antennae shown in the stowed position, with the distal ends of the antenna mounts lying along a locking line 912.

FIG. 10 is an end view (in a plane perpendicular to the direction of forward vehicle travel) of the assembly shown in FIG. 9, with the distal ends of the antenna mounts lying along a locking line 1012.

Figure 11:
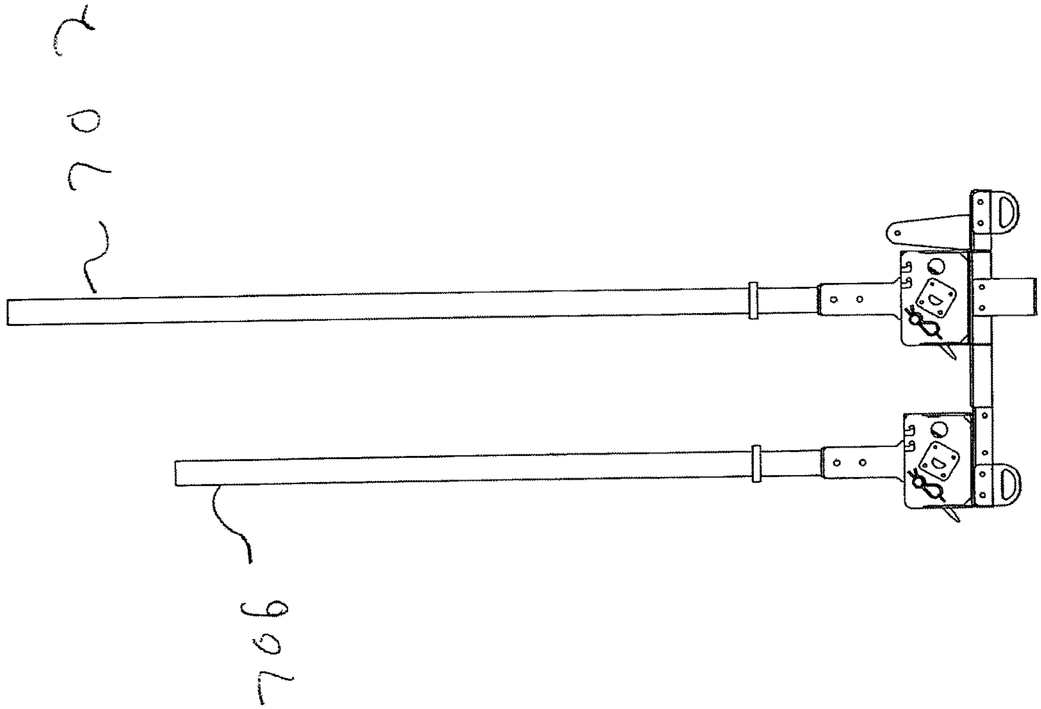
FIG. 11 is a schematic end elevation view (in a plane perpendicular to the direction of forward vehicle travel) of the assembly shown in FIG. 7 in accordance with various embodiments.

FIG. 11 is an end view (in a plane perpendicular to the direction of forward vehicle travel) of the assembly shown in FIG. 7, showing antenna mounts 702 and 707 (mount 704 is hidden behind mount 702).

Figure 13:
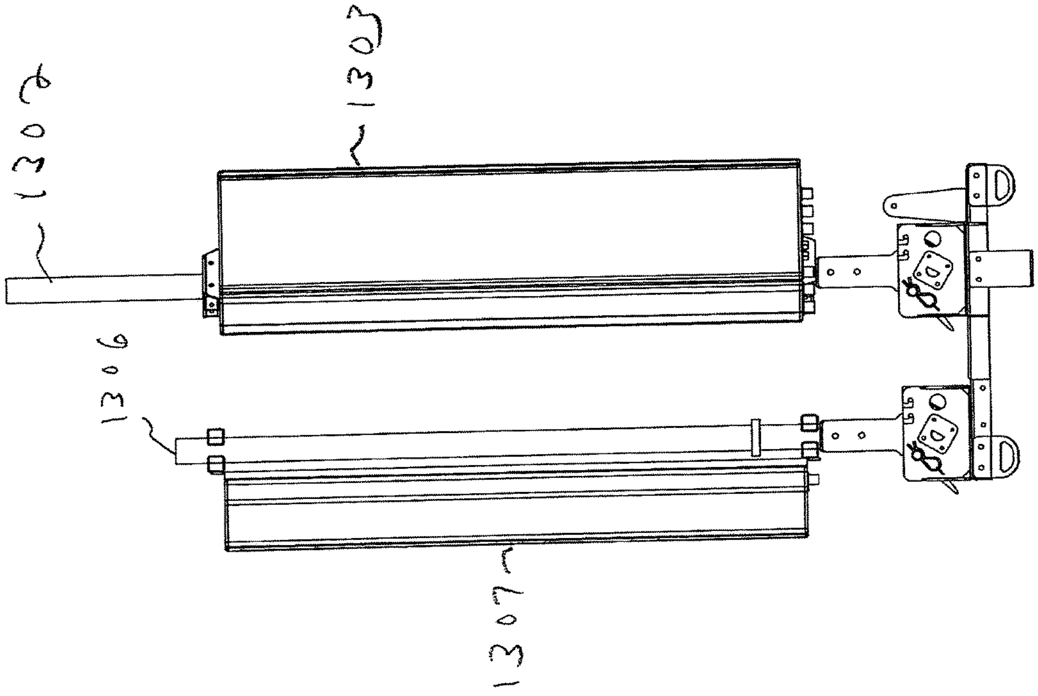
FIG. 13 is a schematic end elevation view (in a plane perpendicular to the direction of forward vehicle travel) of the antenna mounts of FIG. 11 shown with the antennae attached in accordance with various embodiments.

FIG. 12 is a side elevation view of the assembly of FIG. 11, showing antenna mounts of different lengths in accordance with various embodiments;

FIG. 13 is a schematic end elevation view (in a plane perpendicular to the direction of forward vehicle travel) of the antenna mounts of FIG. 11 showing antenna mount 1306 with antenna 1307 attached thereto, and antenna mount 1302 with antenna 1303 attached thereto.

FIG. 14 is a schematic side elevation view (in a plane parallel to the direction of forward vehicle travel) of the antenna mounts of FIG. 12 shown with the antennae attached. In particular, antenna mounts 1402, 1404, and 1406 correspond to antenna mounts 702, 704, and 706, respectively.

FIG. 15 is a perspective view of the antenna assemblies of FIGS. 6, 9, and 10 in the stowed position, showing the distal ends of the antenna mounts lying along a common lock line 1512, with each distal end secured to a locking assembly 1514 connected to the vehicle chassis.

A mobile cellular tower system is provided which includes: an upwardly extendable mast mounted on a vehicle; a support platform connected to a top portion of the mast; a first pivot module connected to the support platform; and a first antenna mount connected to the first pivot module. The first pivot module is configured to pivot the first antenna mount between a stowed position and a deployed position.

In an embodiment, the system further includes a first antenna attached to the first antenna mount, and the first pivot module is configured to pivot the first antenna between a stowed position and a deployed position.

In an embodiment, the mast comprises a telescopic mast.

In an embodiment, the first antenna is substantially horizontal in the stowed position.

In an embodiment, the first antenna is less than about 156 inches from the ground in the stowed position.

In an embodiment, the system further includes: a second pivot module connected to the platform and a third pivot module connected to the platform; a second antenna mount connected to the second pivot module and a third antenna mount connected to the third pivot module; and a second antenna connected to the second antenna mount and a third antenna connected to the third antenna mount. The second pivot module is configured to pivot the second antenna between a stowed position and a deployed position, and the third pivot module is configured to pivot the third antenna between a stowed position and a deployed position.

In an embodiment, the first, second, and third antennae are less than about 156 inches from the ground in the stowed position.

In an embodiment, the first pivot module comprises a hinge about which the first antenna mount is configured to swing between the stowed position and the deployed position.

In an embodiment, the first antenna mount is substantially vertical in the deployed position.

In an embodiment, the first pivot module further comprises a locking mechanism configured to selectively secure the first antenna mount in one of the stowed position and the deployed position.

In an embodiment, the first antenna includes a communication port and the support platform includes a jumper, and the system further includes: a first cable segment extending between the communication port and the jumper; and a second cable segment extending between the jumper and a radio housed within the vehicle.

In an embodiment, the first cable segment is configured to remain connected to the communication port and the jumper as the first antenna mount pivots between the stowed position and the deployed position.

In an embodiment, the system further includes a stowage lock configured to removably secure a distal end of the first antenna mount to the vehicle while the first antenna mount is in the stowed position.

In an embodiment, the system further includes a plurality of stowage locks configured to removably secure respective distal ends of the first, second, and third antenna mounts to the vehicle while the first, second, and third antennae are in the stowed position.

An antenna system for use with a cell phone tower of the type which includes a telescopic mast affixed to a vehicle is provided. The antenna system includes: a support platform configured to be attached atop the mast; first and second pivot modules attached to the support platform; first and second antenna mounts pivotably connected to the first and second pivot modules, respectively; and a stowage lock configured to releasably secure the first and second antenna mounts in a stowed position. The first pivot module is disposed a first distance from the stowage lock and the second pivot module is disposed a second distance from the stowage lock, where the first distance is greater than the second distance; and the first antenna mount comprises a first length and the second antenna mount comprises a second length, where the first length is greater than the second length.

In an embodiment, the first and second pivot modules are configured to facilitate pivoting the first and second antenna mounts between a stowed position and a deployed position.

In an embodiment, the system further includes a first antenna attached to the first antenna mount and a second antenna attached to the second antenna mount, wherein the first and second antennae are less than about 156 inches from the ground in the stowed position.

A method of pre-assembling a temporary cell phone tower of the type having a telescopic mast mounted to a vehicle is provided. The method includes the steps of: attaching a support platform to the mast; pivotably attaching an antenna to the support platform; connecting a communication cable between the antenna and a radio housed within the vehicle; pivoting the antenna into a substantially horizontal stowed position; and locking the stowed antenna to the vehicle chassis.

In an embodiment, the method further includes the steps of: transporting the vehicle to a deployment site; unlocking the antenna from the vehicle chassis; pivoting the antenna to a substantially vertical position while the communication cable remains connected between the antenna and the radio; and extending the mast to thereby raise the antenna.

In an embodiment, connecting the communication cable comprises: connecting a first cable segment between the antenna and the support platform; and connecting a second cable segment between the support platform and the radio.

While the present invention has been described in the context of the foregoing embodiments, it will be appreciated that the invention is not so limited. For example, the foldable mast may include any configuration of members and/or actuators which allow the mast to extend and retract within the dimensional parameters described herein. Moreover, while the extendable mast has been described in the context of a mobile or portable system, the present invention also contemplates permanent or semi-permanent tower installations.

As used herein, the word “exemplary” means “serving as an example, instance, or illustration.” Any implementation described herein as “exemplary” is not necessarily to be construed as preferred or advantageous over other implementations, nor is it intended to be construed as a model that must be literally duplicated.

While the foregoing detailed description will provide those skilled in the art with a convenient road map for implementing various embodiments of the invention, it should be appreciated that the particular embodiments described above are only examples, and are not intended to limit the scope, applicability, or configuration of the invention in any way. To the contrary, various changes may be made in the function and arrangement of elements described without departing from the scope of the invention.

The invention claimed is:

1. A mobile cellular tower system, comprising:

an upwardly extendable, vertically oriented mast having a bottom end mounted above ground on a vehicle and a top end;

a mast extension module operatively connected to the mast;

a support platform connected to the top end of the mast;

a first pivot module connected to the support platform; and a first antenna mount connected to the first pivot module;

wherein the first pivot module is configured to pivot the first antenna mount between a stowed horizontal position and a deployed vertical position; and the mast extension module is configured to extend the mast upwardly with the antenna mount disposed in the deployed vertical position and the bottom terminal portion of said mast mounted above ground on the vehicle.

2. The system of claim 1, further comprising a first antenna attached to the first antenna mount, and further wherein the first pivot module is configured to pivot the first antenna between a stowed position and a deployed position.

3. The system of claim 2, wherein the mast comprises a telescopic mast.

4. The system of claim 3, wherein the first antenna is substantially horizontal in the stowed position.

5. The system of claim 4, wherein the first antenna is less than about 156 inches from the ground in the stowed position.

6. The system of claim 4, further comprising:

a second pivot module connected to the support platform and a third pivot module connected to the support platform;

a second antenna mount connected to the second pivot module and a third antenna mount connected to the third pivot module; and a second antenna connected to the second antenna mount and a third antenna connected to the third antenna mount;

wherein the second pivot module is configured to pivot the second antenna between a stowed horizontal position and a deployed vertical position, and the third pivot module is configured to pivot the third antenna between a stowed horizontal position and a deployed vertical position.

7. The system of claim 6, wherein the first, second, and third antennae are less than about 156 inches from the ground in the stowed position.

8. The system of claim 6, further comprising a plurality of stowage locks configured to removably secure respective distal ends of the first, second, and third antenna mounts to the vehicle while the first, second, and third antennae are in the stowed position.

9. The system of claim 2, wherein the first antenna includes a communication port and the support platform includes a jumper, the system further comprising:

a first cable segment extending between the communication port and the jumper; and a second cable segment extending between the jumper and a radio housed within the vehicle.

10. The system of claim 9, wherein the first cable segment is configured to remain connected to the communication port and the jumper as the first antenna mount pivots between the stowed position and the deployed position.

11. The system of claim 1, wherein the first pivot module comprises a hinge about which the first antenna mount is configured to swing between the stowed horizontal position and the deployed vertical position.

12. The system of claim 11, wherein the first pivot module further comprises a locking mechanism configured to selectively secure the first antenna mount in one of the stowed horizontal position and the deployed vertical position.

13. The system of claim 1, further comprising a stowage lock configured to removably secure a distal end of the first antenna mount to the vehicle while the first antenna mount is in the stowed position.

14. An antenna system for use with a cell phone tower of the type which includes a telescopic mast having a bottom terminal portion mounted above ground on a vehicle and a top end, the antenna system further comprising:

a mast extension module operatively connected to the mast;

a support platform connected to the top end of the mast;

first and second pivot modules attached to the support platform;

first and second antenna mounts pivotably connected to the first and second pivot modules, respectively; and a stowage lock configured to releasably secure the first and second antenna mounts in a stowed horizontal position; wherein:

the first pivot module is disposed a first distance from the stowage lock and the second pivot module is disposed a second distance from the stowage lock, where the first distance is greater than the second distance; and the first antenna mount comprises a first length and the second antenna mount comprises a second length, where the first length is greater than the second length; and the first and second pivot modules are configured to pivot the first and second antenna mounts, respectively, between a stowed horizontal position and a deployed vertical position; and the mast extension module is configured to extend the mast upwardly with the first and second antenna mounts disposed in the deployed vertical position and the bottom terminal portion of said mast mounted above ground on the vehicle.

15. The system of claim 14, wherein the first and second pivot modules are configured to facilitate pivoting the first and second antenna mounts approximately 90 degrees between the stowed position and the deployed position.

16. The system of claim 15, further comprising a first antenna attached to the first antenna mount and a second antenna attached to the second antenna mount, wherein the first and second antennae are less than about 156 inches from the ground in the stowed position.

17. A method of pre-assembling a temporary cell phone tower of the type having a telescopic mast having a bottom terminal portion mounted above ground on a vehicle having a mast extension module operatively connected to the mast, the method comprising the steps of:

attaching a support platform to the mast;

pivotably attaching an antenna to the support platform;

connecting a communication cable between the antenna and a radio housed within the vehicle;

pivoting the antenna into a substantially horizontal stowed position; and locking the stowed antenna to the vehicle chassis with the mast extension module in a retracted position.

18. The method of claim 17, further comprising the steps of:

transporting the vehicle to a deployment site;

unlocking the antenna from the vehicle chassis;

pivoting the antenna to a substantially vertical position while the communication cable remains connected between the antenna and the radio; and extending the mast to thereby raise the antenna.

19. The method of claim 17, wherein connecting the communication cable comprises:

connecting a first cable segment between the antenna and the support platform; and connecting a second cable segment between the support platform and the radio.

* * * * *